United States Patent
Laquer

Patent Number: 5,997,273
Date of Patent: Dec. 7, 1999

[54] DIFFERENTIAL PRESSURE HIP FORGING IN A CONTROLLED GASEOUS ENVIRONMENT

[76] Inventor: Henry Louis Laquer, R.R. 5, Box 445, Espanola, N.Mex. 87532-8906

[21] Appl. No.: 08/521,389

[22] Filed: Aug. 1, 1995

[51] Int. Cl.$^6$ ................................................. B28B 11/00
[52] U.S. Cl. .................... 425/394; 425/405.1; 425/405.2
[58] Field of Search ............................. 425/394, 405.1, 425/405.2

[56] References Cited

U.S. PATENT DOCUMENTS

| | | | |
|---|---|---|---|
| 3,633,264 | 1/1972 | Gripshover et al. | 29/421 |
| 3,732,056 | 5/1973 | Eddy et al. | 425/352 |
| 4,152,111 | 5/1979 | Larker | 432/205 |
| 4,942,750 | 7/1990 | Conaway | 72/56 |
| 5,045,525 | 9/1991 | Heide et al. | 505/1 |
| 5,057,273 | 10/1991 | Hanson | 419/68 |
| 5,059,584 | 10/1991 | Benfer et al. | 505/1 |
| 5,063,022 | 11/1991 | Zick | 419/49 |
| 5,130,104 | 7/1992 | Morris | 422/240 |
| 5,137,663 | 8/1992 | Conaway | 264/36 |
| 5,145,835 | 9/1992 | Takeshita et al. | 505/1 |
| 5,147,086 | 9/1992 | Fujikawa et al. | 228/243 |
| 5,154,882 | 10/1992 | Zick | 419/49 |
| 5,244,638 | 9/1993 | Morris | 422/119 |
| 5,278,137 | 1/1994 | Morita et al. | 505/1 |
| 5,318,745 | 6/1994 | Sakurai et al. | 505/125 |
| 5,319,843 | 6/1994 | Iversen | 29/599 |

*Primary Examiner*—David W. Wu

[57] ABSTRACT

Apparatus and procedures are presented for forging, or hot working bulk ceramics, including high temperature superconductors and other sensitive materials, under precisely controlled conditions of pressure, temperature, atmospheric composition, and strain rate. A capsule with massive end plates and an independent gas supply is located in a modified hot isostatic press (HIP). Essentially uniaxial deformation of a pre-compacted disc with forces of up to 500,000 Newtons (50 tons) and at temperatures of up to 1000 C. can be achieved. The separate gas supply to the capsule can maintain a specified gaseous atmosphere around the disc, up to the operating pressure of the HIP. The apparatus is designed to tolerate partial oxygen pressures of up to 20%.

11 Claims, 3 Drawing Sheets

Differential Pressure Capsule

Fig. 1 – Sealed Bellows Capsule

Fig. 2 – Differential Pressure Capsule

Fig.3 – "Top Hat" Capsule

Fig. 4 – Top View of Capsule

Fig. 5 – Compression Cycle

DIFFERENTIAL PRESSURE HIP FORGING IN A CONTROLLED GASEOUS ENVIRONMENT

GOVERNMENT RIGHTS

The invention described herein arose in the course of Phase II Small Business Innovative Research (SBIR) Contract F49620-91-C-0065 between the Air Force Office of Scientific Research and CryoPower Associates, a sole proprietorship owned by the inventor. The work was sponsored by the Strategic Defense Initiative Organization (SDIO).

BACKGROUND—FIELD OF INVENTION

This invention relates to the uniaxial deformation or forging of thermodynamically unstable, sensitive, or reactive solids, such as oxide ceramics and high-temperature superconductors, under fully controlled conditions of the gaseous chemical environment, pressure, temperature, and strain rate.

BACKGROUND—DESCRIPTION OF PRIOR ART

The present invention draws on a number of overlapping arts in chemistry, metallurgy, and physics. In particular, I apply methods and concepts from the fields of materials deformation and forging, from Hot Isostatic Pressing (HIP) technology, from the thermodynamics of phase transformations and of phase stability, and from the emerging technology of high temperature superconducting ceramic oxides. My objective is to deform solid materials at elevated temperatures and thereby create crystallographic texture in the material, while at the same time maintaining the material in thermodynamic equilibrium with its environment.

The problem of maintaining equilibrium conditions is particularly acute with high temperature superconducting oxides, since most exhibit measurable oxygen vapor pressures at elevated temperatures. Therefore, their equilibrium chemical composition is a function of their gaseous environment, and the surrounding oxygen pressure determines whether a given composition is in a thermodynamically stable state. To subject any of these materials to deformation, or even simple compaction, without controlling their oxygen environment, will put them in a thermodynamically unstable state and they will begin to decompose. The kinetics of such decomposition depends on many factors, but the safe approach is to not allow these materials to be in an environment where they can be unstable.

My invention differs from prior art in that I either use apparatus with similar features to attain totally different objectives, or use different methods and apparatus to achieve comparable objectives.

Hot Pressing

Uniaxial hot pressing, hot deformation, or forging of a solid between anvils or between punches in a die will cause most materials to flow and develop crystallographic textures. Textured materials often exhibit improved mechanical, electrical, or magnetic properties. Uniaxial hot presses can be used to apply a force to a workpiece located inside a furnace that uses either a vacuum or an inert atmosphere. Graphite or ceramic rods transmit the force from a hydraulic press at ambient temperature to the workpiece. Commercially available equipment is always limited in the force that can be applied by the press, typically of the order of 20 tons. The rate or speed with which the force can be applied is limited by the size and cost of the hydraulic compressors and the amount of travel of the punch or anvil.

Much greater capacities and speeds are available with mechanically operated forges, acting on a pre-heated workpiece and deforming it in a fraction of a second. However, forges of this kind are generally unable to provide a controlled or inert gaseous atmosphere around the workpiece. This means that the workpiece must be sealed in a can. Another limitation of such machinery is that it is not possible or practical to slow down the rate of deformation. Even greater forces and speeds are available with explosive compacting and forging, but the same limitations apply to that technology.

By contrast, a conventional hot isostatic press (HIP) is typically used to consolidate or compact powdered or porous solids in a uniform or isostatic manner. The workpiece is often encapsulated or canned, so that a surrounding fluid can be used to apply uniform (isostatic) pressure to all surfaces of the workpiece without penetrating into the pores. The canned workpiece is located inside a furnace, which in turn is surrounded by a thermal shield, and the entire assembly is contained within an externally cooled pressure vessel. Pressures up to 300 MPa (3000 bar or 45,000 psi) and temperatures up to 1500 C., or higher, are readily accessible and easily controllable. However, the size and cost of the available gas compressor usually limits the rate of pressurization to tens of minutes. Whereas uniaxial, non-isostatic compaction in a heated die, i.e. hot pressing, is tonnage- or force-limited, HIP procedures are pressure-limited.

A die insert inside a HIP can be used to convert isostatic into uniaxial forces. U.S. Pat. No. 5,063,022 to Zick (Dec. 5, 1991) and its continuation U.S. Pat. No. 5,154,882, Zick (Oct. 13, 1992) discuss a 'hermetically sealed' die and punch arrangement. These patents are actually a variation of U.S. Pat. No. 5,057,273, Hanson (Oct. 15, 1991) on Uniaxial Compaction in a Cold Isostatic Process and were all assigned to the same company (Industrial Materials Technology, Inc.)

All three of these patents require close mechanical tolerances and careful attention to and reduction of the frictional drag between the die walls and the punch ends. They also demand great care in avoiding the acknowledged possibility of tearing the container that encapsulates the punch-and-die assembly at the point where it is stretched across the die corners. All of them fail to teach how to install a friction-reducing graphite foil at the slip plane without crinkling and thus jamming the die.

Hot Isostatic Press with Multiple Regions

The use of hermetically sealed and welded capsules is common practice in HIP technology and goes back to its very beginnings. A recent U.S. Pat. No. 5,147,086, issued to Fujikawa et al. (Sep. 15, 1992) notes earlier capsule patents, and is herewith attached by reference.

My invention makes use of an independently pressurized capsule within a larger surrounding HIP vessel. There are several patents in the HIP art, that either use such an arrangement, or discuss the problems of independently manipulating the fluids in an enclosure within a HIP vessel.

Gripshover, Boyer, and Harth in U.S. Pat. No. 3,633,264 (Jan. 11, 1972), entitled "Isostatic Forging," plastically deform a balloon-shaped spherical cavity inside a HIP vessel. The cavity has an independent gas supply and it is deformed by increasing the pressure on one of its surfaces (say, the interior one) relative to the opposing (exterior) surface. The object of these inventors is in isostatically deforming the cavity or capsule itself, rather than in uniaxially deforming its contents. Gripshover et al. do not teach how to separately manipulate the gas pressures on the opposing surfaces.

Controlled Atmospheres

Hot pressing or HiPing in an environment of controlled gaseous composition or chemical activity is discussed in a number of patents:

Conaway in U.S. Pat. No. 5,137,663 (Aug. 11, 1992) claims a deformable and reusable can mounted on a plug within a HIP vessel and with an independent gas or vacuum connection to the outside of the vessel. His primary goals are speed and reusability of the can. He mentions evacuation and the possible introduction of special processing gases, as may be required for various workpieces. He also recognizes and discusses the problem of keeping the elastomeric seal between the can and the plug cold. Conaway has no interest in anything other than isostatic compaction, nor would his capsule design readily adapt to uniaxial deformation of a workpiece. He does not discuss the issues of separately manipulating any high pressure gas inside the can.

A very different purpose is served by Larker's invention, U.S. Pat. No. 4,152,111 (May 01, 1979). He discloses a HIP furnace with a separate internal chamber to encapsulate radioactive materials in ceramics, while limiting the possible extent of radioactive contamination. He also describes a dual gas and pressure supply and procedures to maintain the pressures in the two spaces at substantially the same levels. His procedures are, indeed, designed to never permit significant pressure differences between the two spaces. The expense and complexity of operating separate compressors is justified by the contamination problems inherent in his application.

Oxygenation Atmospheres

Many oxide ceramics, including high temperature superconducting compositions, require specific oxygen pressures to be thermodynamically stable. These pressures range from sub-atmospheric to tens of MPa (hundreds of bars). A number of patents disclose methods and apparatus to provide oxygen atmospheres for synthesis and simple compaction. (Our search has excluded the many patents that use a HIP simply for synthesizing materials without addressing the issue of oxygen control; nor have we included work on controlling the oxygen partial pressure when the total pressure is near, or below, atmospheric).

Morris in U.S. Pat. No. 5,130,104 (Jul. 14, 1992) and its continuation U.S. Pat. No. 5,244,638 (Sep. 14, 1993) discloses the design of a commercially available high pressure oxygen furnace, capable of operating at 40 MPa (400 bar) and 1000 C. He discusses the advantages and disadvantages of externally heated furnaces vs. internally heated HIPs. He also addresses the obvious safety hazards associated with reactive high pressure oxygen gas and with high temperature creep of most metals by careful selection of alloys and by numerous other design features. However, his apparatus is primarily designed for laboratory scale synthesis of new compositions and for the measurement of some physical properties, without any provision for compacting the samples. Nor can his equipment be scaled safely to working volumes larger than the 10 mm diameter that is provided.

Similarly the Oxygen HIPing method disclosed by Sakurai et al. in U.S. Pat. No. 5,318,745 (Jun. 07, 1994) is essentially a process for synthesizing a number of superconducting compositions. The cryogenic oxygen HIP proposed by Conaway in U.S. Pat. No. 4,942,750 (Jul. 24, 1990) as a rapid production scheme, would be similarly limited. Unfortunately, the inventor does not address or provide any solutions for the numerous cryogenic engineering, materials, and safety problems that his design would encounter. This includes the issues of dimensional changes, of embrittlement, and of the violent reactivity of most hot metals with oxygen.

The idea of placing an oxygen donor inside a HIP capsule could be a simple way to provide oxygen at the proper instant or temperature during a fabrication process. Two very similar patents Heide et al. in U.S. Pat. No. 5,045,525 (Sep. 03, 1991) and Benfer and Richards in U.S. Pat. No. 5,059,584 (Oct. 22, 1991) specify barium peroxide as the preferred donor. Different methods are used to physically isolate the workpiece. Heide et al. use an elaborate scheme of ceramic (boron nitride) coating, together with buffer regions of intermediate compositions as dictated by details of the phase diagrams, whereas Benfer simply uses a barrier of high purity silica cloth. Takeshita et al. in U.S. Pat. No. 5,145,835 (Sep. 09, 1992) take a different course by admixing various oxides with the superconducting precursor materials in their HIP fabrication process.

In outlining how to approach the oxygenation-deoxygenation problem several years ago, I also reviewed a number of possible oxygen donors, including oxides, peroxides and permanganates. I reached the conclusion that most materials should be kept from mixing with the superconductor, since this would most likely be deleterious to its superconducting properties. I furthermore concluded that one should expect an entirely different performance from materials that lose oxygen reversibly upon heating and then take it up again upon cooling, as compared to materials that simply decompose irreversibly. It also became evident that each oxygen generating compound would perform differently and that a capsule with an externally controllable oxygen supply would provide a much greater latitude in varying the operating conditions.

A somewhat related patent disclosure, Primdahl Iversen and Henriksen, U.S. Pat. No. 5,319,843 (Jan. 14, 1994) possibly attains pressures and temperatures equivalent to HIP conditions, but no specific values are reported. These inventors propose to manufacture a superconducting wire by swaging a composite tube. The tube is connected to an oxygen gas supply and has porous powder-filled channels to assure that the gas can reach a central superconducting core, during both manufacture and subsequent service.

To round out the oxygenation patents, we note a unique disclosure by Eddy et al., U.S. Pat. No. 3,732,056 (May 08, 1973). These inventors use an electrolytic technique to apply partial oxygen pressures of up to 40 MPa (400 bar) at 1000 to 1200 C. to a workpiece inside a uniaxial hot press. At the temperatures of interest and with the properly applied voltages, a semiconducting zirconia die can be made to pump oxygen ions from the outside to the inside and thereby enhance the oxygen partial pressure 400-fold from 0.1 MPa (1 bar) to 40 MPa (400 bar). The partial pressure is readily varied by varying the applied voltage.

Texturing Bulk High Temperature Superconductors

A number of techniques are available for orienting and texturing films of high temperature superconductors. However, for bulk superconductors, the only viable technique is that of Murakami (Jap. Jour. Appl. Phys. vol. 28,1189–94, 1989). The method is generally designated as Quench-and-Melt-Growth (QMG) and is disclosed in U.S. Pat. No. 5,278,137 (Jan. 11, 1994), issued to Morita et al. There is much activity in this area and there are many more recent publications on the subject. The QMG method and its many derivatives essentially heat a material to about 1400 C., quench it, reheat it to 1100 C. and then slowly cool it. QMG is a crystal growing, rather than a mechanical deformation technique.

OBJECTS AND ADVANTAGES

Accordingly, one object and advantage of my invention is to provide a method of hot pressing and uniaxially deforming oxide ceramics and similar materials, such as oxide high temperature superconductors, whose equilibrium chemical composition varies with the composition of the gaseous atmosphere with which they are in contact.

Another object of the invention is to be able to do this over a wide range of temperatures and gas pressures.

Still another object is to perform the process in different gaseous atmospheres, whose oxidizing power can vary from chemically reducing to highly oxidizing, such as pure Argon on one hand and a mixture of 80% argon and 20% oxygen on the other.

A further object is to be able to apply large forces during the deformation.

Yet a further object is to be able to control these forces so that the deformation can take place at fast rates—a few seconds, or at much slower rates tens of minutes or even hours.

Still a further object is to minimize the amount of potentially reactive gases that are present in the equipment at any one time Still further objects and advantages will become apparent from a consideration of the ensuing description and accompanying drawings.

REFERENCE NUMERALS 10 basic capsule assembly
12 workpiece
14 stemmed capsule assembly
16 'Top Hat' capsule assembly
20 lower anvil
22 lower bellows section
24 lower diffusion barrier
26 modified lower anvil
28 gas passages
30 lower porous ceramic pusher disc
32 modified lower bellows section
40 upper anvil
42 upper bellows section
44 upper diffusion barrier
46 upper porous ceramic pusher disc
48 modified upper bellows section
50 hexagonal lug
52 extended upper anvil
54 extended upper bellows section
56 spanner wrench holes
58 threaded blind hole
60 tubular stem
62 tube bore
90 circumferential bellows weld
91 tube-anvil weld
92 bellows-anvil welds
93 lug weld
95 top hat weld

EMBODIMENTS—DESCRIPTION

My invention combines three components from distinct arts in a novel way. The first (A) is a method of uni-axially compressing a workpiece in a hot isostatic press. The second (B) is to be able to compress at rates that do not depend on the capacity of the available compressors. And the third (C) is the control of the chemical composition of the atmosphere surrounding the workpiece.

Figure 1:
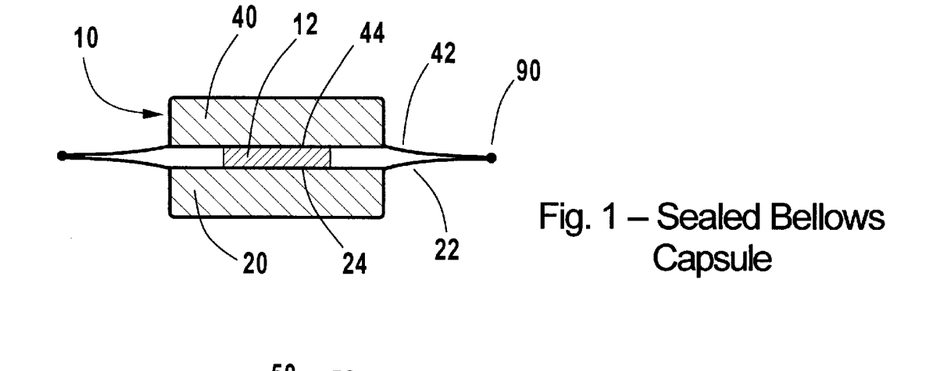
FIG. 1 sketches the basic principle of the first part of the invention. It shows a cross-sectional view of a sealed bellows capsule. Massive end plates convert the applied isostatic pressure into a uniaxial compressive force on a workpiece. All parts have circular symmetry.

FIG. 1 sketches the basic implementation of the first part of my invention, namely how to use an isostatic press (either hot or cold) to apply uni-axial compressive forces to a workpiece that is essentially free to move in all directions perpendicular to that compressive force. The figure shows a cross-sectional view of a basic capsule 10 containing a pill-shaped workpiece 12 between identical massive metallic anvils—a lower anvil 20 and an upper anvil 40. The capsule also has identical metallic bellows sections—a lower bellows section 22 and an upper bellows section 42. Identical contamination or diffusion barriers, a lower diffusion barrier 24 and an upper diffusion barrier 44, prevent adhesion or diffusion between workpiece 12 and lower anvil 20 or upper anvil 40, respectively. The bellows sections 22 and 42 are joined b circumferential weld 90. The entire assembly has circular symmetry.

As in all of the following capsule designs, the detailed construction and assembly of capsule 10 is governed by economic factors that are determined by the number of identical pieces that will be required. As anyone skilled in machine shop economics will recognize, there are cost trade-offs between identically performing welded and machined assemblies. Thus, adjoining lower anvil 20 and lower bellows section 22, as well as adjoining upper anvil 40 and upper bellows section 42, can be machined out of one solid piece of plate and then dished to angle the bellows section. Or they can be manufactured from stock of different thickness by machining, stamping, or spinning and then joined by welding. Or a thin shell could be stamped, formed, or dished in the outline of the entire lower half of capsule 10, including lower bellows section 22, while providing a recess to contain lower anvil 20. This option removes the requirement that lower anvil 20 be weldable to lower bellows section 22 and, indeed, opens up many alternative choices for lower anvil 20. In particular, it allows the substitution of ceramics, or of hard or hardened alloys that cannot or should not be welded. Clearly, due to the symmetry of basic capsule 10, 'upper' and 'upper' are completely interchangeable. Any optional modifications discussed for the lower half apply equally well to the upper half of capsule 10.

Figure 2:
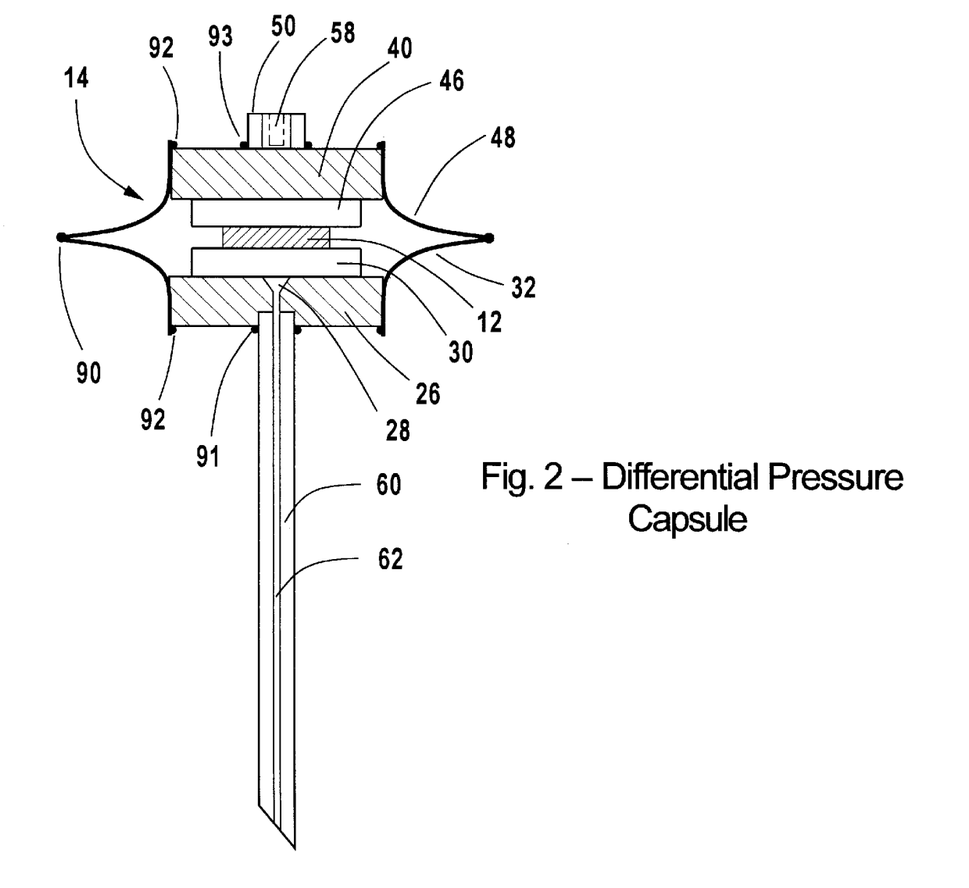
FIG. 2 depicts the second and third parts of the invention, to wit: the addition of a gas supply tube and of gas passages to the interior of the capsule. This makes it possible to compress the workpiece by differential pressure and to implement a controlled atmosphere. The non-deforming porous ceramic pusher plates also facilitate gas access to the workpiece.

FIG. 2 adds the second and third parts of my invention, an independent gas connection from an external source to the interior of the capsule. In this stemmed capsule assembly 14, a tubular stem 60, made from high-pressure tubing, is welded at weld 91 into a modified lower anvil 26. A tube bore 62 communicates with 28 in modified lower anvil 26. We have also a lower anvil 26. We have also added a lower porous ceramic pusher disc 30 in place of lower diffusion barrier 24 (in FIG. 1) between modified lower anvil 26 and workpiece 12. Lower porous ceramic pusher disc 30 assumes the function of lower diffusion barrier 24, provided it is made of, or coated with, a suitable material to avoid contaminating workpiece 12, as will be discussed later. The lower porous ceramic pusher disc 30 also allows gas to reach the surface of workpiece 12 from gas passage 28 in modified lower anvil 26. The upper porous ceramic pusher disc 46 replaces upper diffusion barrier 44 (in FIG. 1) and performs the identical functions between workpiece 12 and upper anvil 40, as does lower porous ceramic pusher disc 30 between workpiece 12 and modified lower anvil 26. In stemmed capsule assembly 14 metallic upper and lower parts are no longer interchangeable, except for the modified bellows sections 32 and 48. Modified lower bellows section 32 and modified upper bellows section 48 are attached to their respective anvils—modified lower anvil 26 and upper anvil 40—by identical welds 92. A hexagonal lug 50 is welded to upper anvil 40 at lug weld 93 to permit mounting an dismounting the capsule inside the HIP vessel by tightening and loosening a conventional sealing gland at the bottom of its tubular stem.

Mounting a stem-equipped (or 'stemmed') capsule and simultaneously connecting it to a conventional high-pressure gas feed-through, preferably in the bottom plug of the HIP pressure vessel, is most readily done with a conventional sealing gland that combines these two functions. As anyone versed in the art will recognize, there are many well-known ways to achieve this functionality. One of the simplest ones is to weld a short cylindrical gland near the bottom of the stem, with just enough of the stem protruding from the gland to allow the machining of a fine male thread, typically size ¼-28 UNF. The threaded portion can then be screwed into a matching female thread at the exit port from the high-pressure gas feed-through. The gland is given an O-ring groove to accommodate an elastomeric O-ring to seal against a flat, polished surface on the bottom plug. However, this is not a unique solution and many other gland designs and sealing materials, such as soft copper gaskets, can also be used.

The independent gas connection to stemmed capsule assembly 14 provides the somewhat counterintuitive benefit in that workpiece 12 can be compressed very quickly by simply venting some of the gas from capsule 14.

Figures 3, 4:
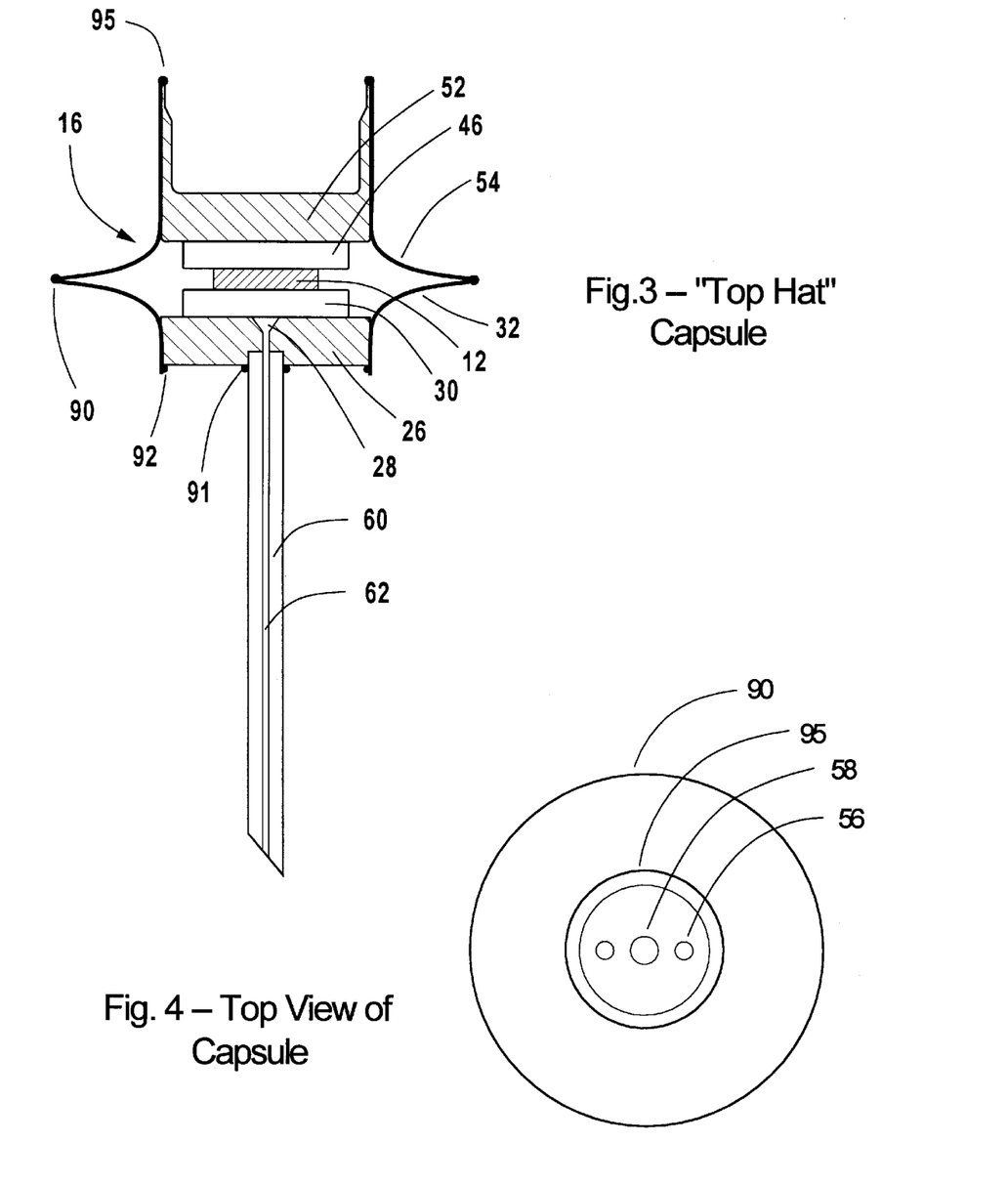
FIG. 3 displays the preferred 'Top Hat' capsule design with an extended top section to prevent overheating of a sensitive workpiece during the sealing of the capsule.
FIG. 4 shows a top view of the capsule of FIG. 3, with the holes that accept a spanner wrench for mounting the capsule in the bottom of the HIP vessel by its gas supply tube, and with a threaded hole for inserting a lifting bolt.

FIG. 3 shows our most preferred 'Top Hat' capsule assembly 16. The extended upper anvil 52 greatly eases the sealing of capsule assembly 16. An extended upper bellows section 54, together with the longer and thinner heat conduction path in extended anvil 52, reduce the danger of overheating a sensitive workpiece 12 during the final sealing of capsule 16 at tip hat weld 95. The internal components of 'Top Hat' capsule assembly 16, as well as modified lower anvil 26, tubular stem 60, and the use of a sealing gland assembly are unchanged from the less elaborate stemmed capsule assembly 14. For the Top Hat capsule 16, the extended upper bellows section 54 is preferably manufactured by spinning a thin sheet of material.

FIG. 4 gives a top view of 'Top Hat' capsule assembly 16, indicatng the location of the blind spanner wrench holes 56 that permit tightening and loosening the sealing gland. A blind threaded hole 58 in the center of extended upper anvil 52 allows the attachment of a lifting bolt for removal of capsule 16 from the HIP furnace.

Figure 5:
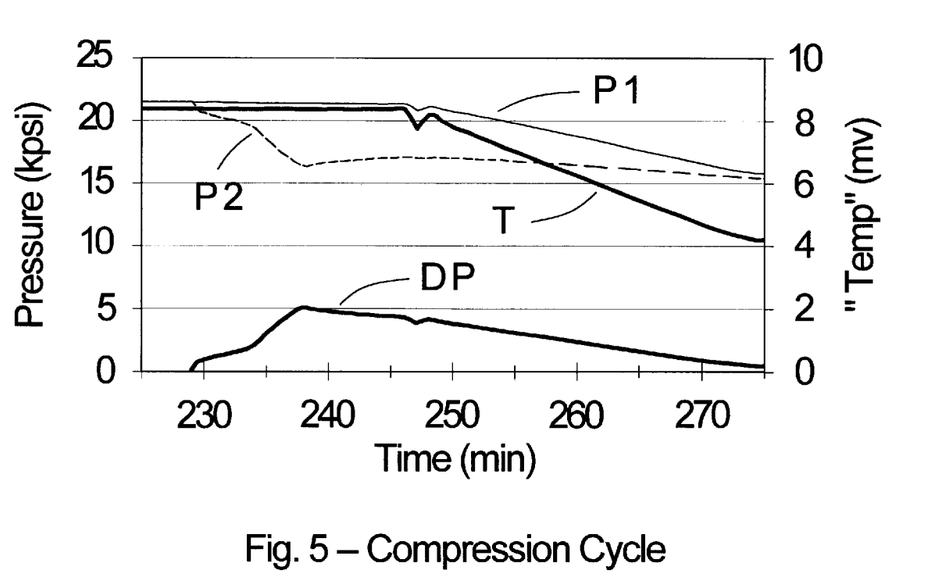
FIG. 5 presents a plot of temperature (in mV), HIP pressure, capsule pressure, and differential pressure (in kps) against time (in minutes) for a compression cycle.

FIG. 5 is a plot of temperature T (in mV from a Pt-PtRh thermocouple and of various pressure (in kpsi) against (in minutes) during a compression cycle. The pressures are the pressure of the HIP fluid, P1, as measured by a gauge, G1, and the pressure of the capsule fluid, P2, as measured by a gauge, G2. The differential pressure DP, defined as P1–P2, is computed by the instrumentation to a resolution of better than 0.1% of full scale. The interpretation of the details of FIG. 5 will be given in the operations section.

Operation

As previously mentioned, my invention provides a method and apparatus to uniaxially compress and thereby deform solid materials whose stable chemical composition depends on the composition of their gaseous environment. It should be noted that the term 'pressure', unfortunately, appears in two very different contexts. The first is used to characterize compression and deformation and is the force applied per unit area. It is a quantity that we can control and manipulate.

The second usage is to describe the pressure of the 'atmosphere' that surrounds the materials which with we are working, as well as the partial pressures of various components of that atmosphere. We can control the pressure and chemical composition of this atmosphere. However, the materials themselves establish what is variously called vapor pressure, decomposition pressure, or thermodynamic equilibrium pressure. That pressure is a specific property of each material. It varies (increases) with temperature, but has different values for each chemical compound or composition. Most of the compositions of interest in this work are oxides and, for most practical purposes, the 'vapor' of interest is oxygen gas.

If we can make the partial pressure of oxygen, i.e. the total gas pressure multiplied by the percentage of oxygen in the atmosphere, equal to the equilibrium vapor pressure, the material is stable. If the partial pressure is less than the equilibrium pressure, the material will lose oxygen and its composition will change. Similarly, if the partial pressure is higher than the equilibrium pressure, the material will gain oxygen. The rates at which these changes take place, i.e. the kinetics of the reaction, can be quite slow, so that the quantities of 'reaction products' can be quite small. Nevertheless, small impurities can have significant effects, either detrimental or beneficial, for the kinds of materials of interest in this work.

To recapitulate, this invention manipulates the compressive force on a solid material, while at the same time controlling the composition of the gas in the atmosphere surrounding the solid and, thus, the chemical stability, or thermodynamic state of the solid. The steps to accomplish these operations for the preferred embodiment of my invention are:

(a) preparing the workpiece,
(b) loading and sealing the capsule,
(c) loading, pressurizing and heating the HIP
(d) compressing the workpiece, and
(e) cooling and unloading the HIP.

(a) Sample Preparation

Sample preparation usually consists of cold pressing a measured quantity of commercially available powder in a cylindrical die to form a short right cylinder or 'pill'. Exposure to atmospheric moisture can be detrimental to many sensitive oxide materials. It is best, therefore, to store, weigh, and load the powders under the dry conditions of a glove box. Similarly, any handling and storage of the pill should be done under dry argon gas. Typical sizes for the pills used with our equipment are a diameter of 10 to 25 mm and a height of 2 to 7 mm. However, these sizes simply result from the interior dimensions of the available apparatus and are not an intrinsic limitation imposed by safety considerations. There is no reason why the above dimensions could not be scaled up by a factor of 10. Of course, the equipment would be considerably more expensive, but it does exist. Modifications to accommodate a capsule gas feed-through into a HIP vessel would only represent a minor cost increase.

(b) Encapsulation the outer capsule components must be fabricated from a weldable, oxygen-tolerant material. Three nickel alloys, trade-marked and available from the International Nickel Company, Inc. are suitable. We have used pure nickel (alloy 200), and Inconel 600 for the basic capsule assembly 10. For the stemmed capsule assemblies 14 and 16, the nickel-copper alloy, Monel 400, is most preferred, particularly since high, pressure tubing in the same ally can be obtained from Autoclave Engineers Group (Erie Pa.).

In the preferred embodiment workpiece 12 is placed between two porous ceramic pusher discs 30 and 46. The material of these discs must be compatible with the workpiece. That is, there should be no contamination, diffusion, or chemical interaction between the discs and the workpiece. Ground-to-size porous alumina disc can be obtained from Bolt Technical Ceramics, Inc. in Conroe Tex. To further reduce any interaction between the alumina and typical high temperature superconductors, the alumina can be coated wit an yttria (yttrium oxide) spray and then baked. This material is available in aerosol form from ZYP Coatings, Inc. in Oak Ridge, Tenn. Pure yttria ceramic disks are even more preferred for chemical compatibility and can be obtained from Custom Specialty Ceramics, Inc. in Arvada, Colo.

the capsules are assembled by welding. The only difference is in the location of the final weld closure. For capsules 10 and 14 (FIGS 1 and 2), the final assembly is made at circumferential bellows weld 90 between the upper and lower bellows sections. This makes it difficult to keep the workpiece from overheating. For the preferred 'Top Hat' capsule assembly 16 (FIG. 3), the final closure is made at top hat weld 95, which is further away from workpiece 12.

(c) Pressurization-Heating cycle

The Hot Isostatic Press used is a commercial 1980's model 'Mini-HIPper', manufactured by Conaway Pressure Systems, upgraded with an oxygen-tolerant 'Hoskins' furnace and with modem pressure and temperature controllers and modified by adding a high-pressure gas feed-through in the bottom plug of the pressure vessel.

Installation of the stemmed assemblies 14 and 16 into the HIP is facilitated by provisions for wrenching. Assembly 14 accepts a socket wrench and assembly 16 a spanner wrench. A fine male machine thread at the bottom of stem 60 permits proper tightening of the O-ring seal in a conventional sealing gland. The preferred material for the O-ring is silicone rubber. There is no concern about overheating the rubber, since the entire sealing gland is in good thermal contact with the massive bottom plug of the HIP.

the primary concern in pressurizing and subsequent heating of the apparatus is to keep the capsule pressure, P2, from exceeding the vessel pressure, P1. Capsules 14 and 16 and the sealing gland assembly were designed for P1 always being equal to or larger than P2. If these conditions should be reversed, the capsule could balloon and its contents could become rearranged. A pressure in the wrong direction could also cause the sealing gland assembly to leak and its associated fine machine thread to fail.

One cylinder (or cylinder bank), S-1, supplies pure argon, and another cylinder, S-2, supplies the special gas mixtures required by the process, such as 20% oxygen in 80% argon. For economic reasons it is desirable t use only a single compressor for both gas supplies. In that case the initial filling of the entire system is done from the process gas supply, S-2. It is important that the initial gas inrush into the system be throttled, since the fluid circuits to the HIP vessel and to capsules 14 or 16 have very different flow impedances. This is done by having a throttle valve in parallel with a full flow valve and by being able to observe the difference between P1 ad P2 with great resolution, using a matched pair of 200 MPa (2000 bar or 30,000 psi) strain gauge pressure transducers, made by Dynisco in Sharon, Mass. The associated instrumentation allows observing pressure differences with a resolution of better than 0.02 Mpa (0.2 bar, 3 psi).

At a predetermined pressure, the two gas systems are sealed off from each other and further pressurization of the HIP vessel can be done with gas from the HIP gas supply. This and the subsequent heating cycle the require a passive or automatic pressure equalizer int he form of an equal-area freely floating (1:1) piston. Its function is to keep the different gas compositions in the HIP and capsule systems from mixing, while maintaining them at the same pressure. It can be obtained from High Pressure Equipment Company in Erie, Pa. Alternatively, and when working at shorter time scales, mixing between gases of different composition can be slowed down by replacing the equalizer with a long length of 2.11 mm I.D. high pressure tubing. In such an arrangement, mixing will be limited by the slowness of gas diffusion in a long, small diameter tube. However, this arrangement requires a detailed analysis of the relative magnitudes of the heated and 'dead' volumes of the capsule and vessel fluid circuits, in order to assure that any flow is out of the capsule so that the composition of the capsule fluid remains unchanged.

Our standard operating procedure is to initially use a throttling valve to fill the entire system to bottle pressure with process gas, S-2. Next, we open a parallel full flow valve and use a Haskel™ air-driven, high-pressure gas compressor to raise the pressure to 40 or 60 MPa (400 to 600 bar or 6000 to 9000 psi). It is possible to switch from the process supply, S-2, to the inert argon supply, S-1, before reaching 60 MPa. This depends on the volume of the equalizer and on the desired gas compositions. Finally, depending on the desired ultimate pressure and temperature, the compressor is stopped, all supply valves are closed, the HIP furnace is turned on and ramped up under microprocessor control. This, of course, raises both pressure and temperature at the same time.

Once the desired pressure and temperature conditions are reached, the pressure equalizer is disabled by closing a valve in series with it ad the differential pressure is observed to make sure that there are no leaking valves.

(d) Compression

Compression of the contents of the capsule is accomplished in an extremely simple and uncomplicated manner by opening a venting valve on the capsule lines and releasing some of the gas from the capsule. The rate of compression and consequent rate of deformation of the contents of the capsule are simply controlled by the degree of opening of that valve. The whole process can be done in less than a minute, in about 8 minutes, as shown in FIG. 5, or over much longer time intervals. There is no punch and die that might bind (as mentioned in the literature). The drop in the value of the pressure difference apparent between 238 and 246 minutes (FIG. 5) is probably caused by plastic flow in the capsule, leading to a reduction in volume and consequent increase in capsule pressure.

(e) Cool-Down

After the desired holding interval, the furnace can either be 'scrammed' for rapid cool-down, in effect quenching the workpiece (as seen by the blip at 247 minutes), or it can be programmed to cool at any desired slower rate.

Conclusions, Ramifications, and Scope

Accordingly, it can be seen that my invention combines some of the more useful aspects of conventional hot pressing and of hot isostatic pressing. It provides texturing and densification, both of which tend to improve materials properties and performance. It offers a new way of hot working, or forging for materials that are sensitive to the chemical composition of their gaseous environment by fully controlling that environment. At the same time, my invention can carry out the deformation over a wide range of time scales, without requiring expensive high-speed, high-volume compressors. The ability to vary the rates is a significant advantage, because the plastic deformation and flow exhibited by many materials in response to applied forces is often quite rate dependent. It is, therefore, difficult to a priori predict optimum deformation schedules. It is obviously useful to have an apparatus that allows sufficient variation in the rate parameters to determine the optimum process.

My invention also has the advantage that, if corrosive or hazardous gases are needed to maintain chemical equilibrium, their amounts can be minimized to just the volume of the capsule. At the same time the amount of the, sometimes expensive, alloys that can handle the corrosive materials is limited to the capsule and its connecting tubing.

An incidental advantage of my procedure is that the presence of the gas required for chemical stability does not prevent full compaction of the workpiece, as it would with a canned HIP procedure.

My solution to providing uniaxial compression with the anvils and pusher discs inside a capsule does not suffer some of the drawbacks of conventional punch and die arrangements. In particular, we do not have to be concerned with binding and jamming of the punch.

Although the above description contains many specificities, these should not be construed as limiting the scope of the invention, but as merely providing illustrations of some of the presently preferred embodiments of this invention. Various other embodiments and ramifications are possible within it's scope. For example, the ceramic pusher discs do not have to have plane pusher surfaces. They could be convex or concave to deform the workpiece into a more complex shape than simple disc.

Nor need the material of the workpiece be limited to just oxides. Indeed, almost any inorganic compound or composition, as well as some organic ones, could be candidates for hot, cold, or warm forging by my differential pressure procedure. Finally the use of my apparatus need not be limited to only providing thermodynamically stable products. There is much interesting work that can be done with metastable, quenched or partially transformed phases. The apparatus is, of course, equally able to function in such a regime of instability.

Thus the scope of the invention should be determined by the appended claims and their legal equivalents, rather than by the examples given.

I claim:

1. An apparatus for forging, or mechanically deforming a solid body, comprising:

(a) a sealed capsule with flexible segments, containing said solid body, (b) a tubular stem, one end of said tubular stem being connected to said sealed capsule, said tubular stem providing a fluid passage to the interior of said capsule, and said tubular stem also supporting said sealed capsule in the controlled temperature region of the pressure vessel of a conventional Hot Isostatic Press, or HIP, (c) a means of connecting and attaching the other end of said tubular stem to the outlet of a conventional high-pressure fluid feed-through into said pressure vessel, (d) a fluid connection from the exterior of said pressure vessel through said feed-through to the interior of said tubular stem and from the interior of said tubular stem to the interior of said sealed capsule, (e) interconnected fluid supply vessels, valves, piping, compressors and fluid handling equipment to provide separate and independent supplies of fluids at elevated pressures: a supply of capsule fluid to the interior of said capsule, and a supply of pressure vessel fluid to the interior of said pressure vessel, whereby the pressure and composition of said fluids are manipulated independently of each other, (f) fluid passages within said capsule and within the contents of said capsule, whereby said capsule fluid communicates throughout said capsule and contacts substantially the entire surface of said solid body, (g) combined means of equalizing the pressure of said fluids and of preventing mixing of said pressure vessel fluid with said capsule fluid, (h) at least one pair of rigid, plate-like shaped anvils, said anvils forming an integral part of said capsule, said anvils being located pairwise on opposite sides of said solid body, one side of said anvils being in contact with said solid body and with said capsule fluid, and the other side of said anvils being in contact with said pressure vessel fluid, and said anvils thereby being capable of translating any pressure difference between said pressure vessel fluid and said capsule fluid into substantially uni-axial compressive forces on said solid body, and (i) a means of releasing some of said capsule fluid in a predetermined manner, thereby reducing the fluid pressure inside said capsule and generating a predetermined pressure difference between the exterior and the interior of said capsule, whereby a force is applied to said solid body by said anvils, thereby compressing and deforming said solid body at predetermined conditions of strain rate, of temperature, and of the pressure, chemical composition and chemical activity of its fluid environment, so that the thermodynamic state of said solid body within said surrounding capsule fluid remains defined during the deformation process.

2. The apparatus set forth in claim 1 (part g), wherein said pressure equalization means without mixing is implemented by an equal-area floating piston.

3. The apparatus set forth in claim 1 (part g), wherein said pressure equalization means without mixing is implemented by a length of small diameter high pressure tubing of at least 1 m in length.

4. The apparatus set forth in claim 1 (part h), wherein the design of said anvils is implemented in cylindrical geometry.

5. The apparatus set forth in claim 1 (part h), wherein the surfaces of said anvils in contact with said solid body are covered with a refractory coating, said coating serving as a diffusion barrier and thereby preventing adhesion to and chemical changes in said solid body.

6. The apparatus set forth in claim 5, wherein said refractory coating consists of yttria.

7. The apparatus set forth in claim 1 (part h), wherein each set of said pairwise anvils consists of both metallic and refractory non-metallic components, selected, in combination, to provide rigidity and a barrier to diffusion across the interface between said anvils and said solid body.

8. The apparatus set forth in claim 7, wherein said components contain interconnected channels or pores thereby facilitating the free entry, exit and circulation of said capsule fluid to the surfaces of said solid body.

9. The apparatus set forth in claim 7, wherein the material for said non-metallic components is selected from a group of refractory oxides, the group consisting of magnesia, alumina, titania, yttria, zirconia, and ceria.

10. The apparatus set forth in claim 1 (part i), wherein a precision metering valve is installed to partially release said fluid in said capsule at a predetermined rate, thereby controlling the rate of application of said compressive and deforming force and thereby deforming said solid body over time scales ranging from seconds to hours.

11. The apparatus set forth in claim 1 (part h), wherein a formed shell capsule supports and locates a pair of anvils on opposite sides of said solid body.

* * * * *